United States Patent
Yu et al.

(10) Patent No.: US 10,298,342 B2
(45) Date of Patent: May 21, 2019

(54) COMMUNICATION METHOD BASED ON TIME DIVISION MULTIPLE ACCESS COMMUNICATION SYSTEM, AND TERMINAL

(71) Applicant: Hytera Communications Corp., Ltd., Shenzhen, Guangdong (CN)

(72) Inventors: Yang Yu, Guangdong (CN); Yan Xu, Guangdong (CN); Zhenghua Luo, Guangdong (CN); Fan Yang, Guangdong (CN)

(73) Assignee: Hytera Communications Corporation Limited, Shenzhen, Guangdong (CN)

(*) Notice: Subject to any disclaimer, the term of this patent is extended or adjusted under 35 U.S.C. 154(b) by 118 days.

(21) Appl. No.: 15/102,421

(22) PCT Filed: Dec. 11, 2013

(86) PCT No.: PCT/CN2013/089070
§ 371 (c)(1),
(2) Date: Jun. 7, 2016

(87) PCT Pub. No.: WO2015/085511
PCT Pub. Date: Jun. 18, 2015

(65) Prior Publication Data
US 2016/0323054 A1    Nov. 3, 2016

(51) Int. Cl.
*H04J 3/06* (2006.01)
*H04B 7/26* (2006.01)
(Continued)

(52) U.S. Cl.
CPC .......... *H04J 3/0652* (2013.01); *H04B 7/2643* (2013.01); *H04B 7/2656* (2013.01); *H04J 3/1694* (2013.01); *H04L 5/0007* (2013.01)

(58) Field of Classification Search
None
See application file for complete search history.

(56) References Cited

U.S. PATENT DOCUMENTS

| | | | | |
|---|---|---|---|---|
| 5,258,980 A | * | 11/1993 | Maebara | H04W 36/18 370/347 |
| 2003/0031175 A1 | * | 2/2003 | Hayashi | H04L 1/1809 370/390 |

(Continued)

FOREIGN PATENT DOCUMENTS

| | | |
|---|---|---|
| CN | 1678973 A | 10/2005 |
| CN | 1816992 A | 8/2006 |

(Continued)

OTHER PUBLICATIONS

Extended European Search Report for Application No. 13899054.4, dated Nov. 16, 2016.

(Continued)

*Primary Examiner* — Christopher T Wyllie
(74) *Attorney, Agent, or Firm* — Wolf, Greenfield & Sacks, P.C.

(57) ABSTRACT

Disclosed are a communication method based on a time division multiple access communication system, and a terminal. The method comprises: receiving, by a communication terminal, an embedded signalling frame, conducting embedded type information parsing on the embedded signalling frame to obtain an embedded signalling and control information; in accordance with the control information, caching, by the communication terminal, the embedded signalling to corresponding caching regions; and when each corresponding caching region has already been cached with the embedded signalling, conducting embedded type signalling decoding, by the communication terminal, on the embedded signalling in all the caching regions so as to obtain a control signalling. The technical solution of the (Continued)

present invention can shorten the terminal access duration of the time division multiple access communication system, thereby improving the access performance of the time division multiple access communication system.

14 Claims, 7 Drawing Sheets

(51) Int. Cl.
*H04J 3/16* (2006.01)
*H04L 5/00* (2006.01)

(56) References Cited

U.S. PATENT DOCUMENTS

| | | | |
|---|---|---|---|
| 2003/0031210 A1* | 2/2003 | Harris | H04L 1/1841 370/516 |
| 2004/0004995 A1 | 1/2004 | Boesel et al. | |
| 2004/0229651 A1* | 11/2004 | Hulkkonen | H01Q 1/246 455/562.1 |
| 2004/0246983 A1 | 12/2004 | Kaatz | |
| 2005/0146462 A1* | 7/2005 | Abraham | G01S 5/0036 342/357.62 |
| 2008/0169979 A1* | 7/2008 | de Salas | G01S 19/03 342/357.4 |
| 2009/0146871 A1* | 6/2009 | Abraham | G01S 19/05 342/357.73 |
| 2009/0219916 A1 | 9/2009 | Bohn | |
| 2009/0303923 A1* | 12/2009 | Wiatrowski | H04L 47/245 370/328 |
| 2010/0002817 A1* | 1/2010 | Vrcelj | H04L 25/0212 375/354 |
| 2010/0232369 A1* | 9/2010 | Jing | H04W 72/0486 370/329 |
| 2013/0346499 A1* | 12/2013 | Spencer | H04L 65/403 709/204 |
| 2014/0120935 A1* | 5/2014 | Li | H04W 56/0045 455/452.1 |

FOREIGN PATENT DOCUMENTS

| | | |
|---|---|---|
| CN | 102984682 A | 3/2013 |
| EP | 0372795 A2 | 6/1990 |
| JP | 2000358277 A | 12/2000 |

OTHER PUBLICATIONS

No Author, Electromagnetic compatibility and Radio spectrum Matters (ERM); Digital Mobile Radio (DMR) Systems; Part 1: DMR Air Interface AI protocol. European Telecommunications Standards Institute. Jul. 2013. (V2.3.1): 1-174.

International Search Report, dated Sep. 30, 2014, from corresponding International Application No. PCT/CN2013/089070.

* cited by examiner

COMMUNICATION METHOD BASED ON TIME DIVISION MULTIPLE ACCESS COMMUNICATION SYSTEM, AND TERMINAL

This application is the national phase of International Application No. PCT/CN2013/089070, filed on Dec. 11, 2013, and titled "COMMUNICATION METHOD BASED ON TIME DIVISION MULTIPLE ACCESS COMMUNICATION SYSTEM AND TERMINAL", which application is hereby incorporated by reference to the maximum extent allowable by law.

FIELD

The disclosure relates to the technical field of communication, and in particular to a communication method and a terminal based on a time division multiple access communication system.

BACKGROUND

In order to meet the requirements on mobile communication of low-end and midrange commercial users and professional users in European countries, the European Telecommunication Standards Institute (ETSI) established the Open standard Digital Mobile Radio (DMR) standard suitable for public utilities, educational institutions, hospitals, hotels, property management companies and other industries.

A DMR voice signal is transmitted using a super frame structure, where each super frame is composed of 6 bursts which are identified using letters A to F in sequence, where a burst A indicates a beginning of the super frame, a middle portion of the burst A is used to carry a sync word (SYNC), and middle portions of bursts B to F are used to carry embedded singling. A processing scheme for establishing a DMR voice communication includes the following steps. Firstly, a burst A is searched for, and when the burst A is found, the communication terminal synchronizes to an air interface timing. Then, bursts B, C, D, E and F are received and parsed successively to acquire four embedded signalings of which link control start/stop (LCSS) indications are "beginning", "middle", "middle" and "end", and the four embedded signalings are decoded to acquire an Link Control (LC) signaling. Finally, it is determined whether the call is directed to the current communication terminal in accordance with a Protocol Data Unit (PDU) in the LC signaling.

Similarly, a processing scheme for establishing a common announcement channel (CACH) includes the following steps. Firstly, it has to be determined that a CACH frame carrying a short embedded signaling of which an LCSS indication is the beginning is received. Then, CACH frames carrying short embedded signalings of which LCSS indications are "middle", "middle" and "end" are received successively, and the four short embedded signalings are decoded to acquire a short LC signaling. Finally, it is determined whether a call is directed to the communication terminal in accordance with a compressed address in the short LC signaling.

Communication schemes of current time division multiple access communication systems are similar to the above scheme adopted by the DMR system, where a processing must be performed in an exact receive sequence thereby resulting in a long access duration of the communication terminal, which seriously impacts the access performance of the system.

SUMMARY

A communication method and a terminal based on a time division multiple access communication system are provided according to the disclosure so as to reduce an access duration of the terminal thereby improving the access performance of the time division multiple access communication system.

In order to solve the above technical issue, the present disclosure takes the following technical solutions.

In a first aspect, a communication method based on a time division multiple access communication system is provided according to the disclosure, which includes:

receiving, by a communication terminal, an embedded signaling frame, and performing, by the communication terminal, embedded information parsing on the embedded signaling frame to acquire embedded signalings and control information;

buffering, by the communication terminal, the embedded signalings into corresponding buffer regions in accordance with the control information; and performing, by the communication terminal, embedded signaling decoding on the embedded signalings in all of the buffer regions to acquire a control signaling when each of the buffer regions has buffered a corresponding embedded signaling.

Preferably, the buffering, by the communication terminal, the embedded signalings into the corresponding buffer regions in accordance with the control information may include:

buffering, by the communication terminal, a current embedded signaling into a buffer region corresponding to a position indicated by current control information; and adjusting, by the communication terminal, a position of the buffered current embedded signaling in accordance with the position indicated by the current control information and a position indicated by next control information.

Preferably, before the receiving, by a communication terminal, the embedded signaling frame, the method may further include:

storing, by the communication terminal, an air interface timing of a current channel;

estimating, by the communication terminal, an air interface timing of a channel to switch to in accordance with the stored air interface timing of the current channel; and synchronizing, by the communication terminal, to the channel to switch to in accordance with the estimated air interface timing.

Preferably, the estimating, by the communication terminal, the air interface timing of the channel to switch to in accordance with the stored air interface timing of the current channel may include:

estimating, by the communication terminal, that the air interface timing of the channel to switch to is the same as the stored air interface timing of the current channel, in a case that the current channel and the channel to switch to have a same frequency and a same time slot; and determining, by the communication terminal, the air interface timing of the channel to switch to, in accordance with a time-slot relationship between the current channel and the channel to switch to, in a case that the current channel and the channel to switch to have a same frequency and different time slots.

Preferably, in a case that the embedded signaling frame is a voice super frame, the method may further include:

determining, by the communication terminal, whether protocol data unit information in the control signaling indicates that a call is directed to the communication terminal; and turning on, by the communication terminal, a speaker of the communication terminal to receive the voice call, in a case that the protocol data unit information indicates that the call is directed to the communication terminal.

Preferably, in a case that the embedded signaling frame is a common notification channel frame, the method may further include:

determining, by the communication terminal, whether a compressed address in the link control signaling is a compressed address of the communication terminal; and scanning, by the communication terminal, a next channel in a case that the compressed address is not the compressed address of the communication terminal.

In a second aspect, a communication terminal based on a time division multiple access communication system is provided according to the disclosure, which includes:

a reception unit configured to receive an embedded signaling frame;

a parsing unit configured to perform embedded information parsing on the embedded signaling frame to acquire embedded signalings and control information;

a buffering unit configured to buffer the embedded signalings into corresponding buffer regions in accordance with the control information; and a decoding unit configured to perform embedded signaling decoding on the embedded signalings in all of the buffer regions to acquire a control signaling when each of the buffer regions has buffered a corresponding embedded signaling.

Preferably, the buffering unit may include:

a storage module configured to buffer a current embedded signaling into a buffer region corresponding to a position indicated by current control information; and an adjustment module configured to adjust a position of the buffered current embedded signaling in accordance with the position indicated by the current control information and a position indicated by next control information.

Preferably, the terminal may further include:

a storage unit configured to store an air interface timing of a current channel;

an estimation unit configured to estimate an air interface timing of a channel to switch to in accordance with the stored air interface timing of the current channel; and a synchronization unit configured to synchronize to the channel to switch to in accordance with the estimated air interface timing.

Preferably, the estimation unit may include:

a first estimation module configured to estimate that the air interface timing of the channel to switch to is the same as the stored air interface timing of the current channel in a case that the current channel and the channel to switch to have a same frequency and a same time slot; and a second estimation module configured to determine the air interface timing of the channel to switch to in accordance with a time-slot relationship between the current channel and the channel to switch to in a case that the current channel and the channel to switch to have a same frequency and different time slots.

Preferably, in a case that the embedded signaling frame is a voice super frame, the terminal may further include:

a first determination unit configured to determine whether protocol data unit information in the control signaling indicates that a call is directed to the communication terminal; and a first control unit configured to turn on a speaker of the communication terminal to receive the voice call in a case that the protocol data unit information indicates that the call is directed to the communication terminal.

Preferably, in a case that the embedded signaling frame is a common notification channel frame, the terminal may further include:

a second determination unit configured to determine whether a compressed address in the link control signaling is a compressed address of the communication terminal; and a second control unit configured to scan a next channel in a case that the compressed address is not the compressed address of the communication terminal.

A communication method and a terminal based on a time division multiple access communication system are provided according to the disclosure so as to reduce an communication establishment duration thereby improving the access performance of the system. A communication terminal receives an embedded signaling frame, and performs embedded information parsing on the embedded signaling frame to acquire embedded signalings and control information, in order to prepare technically for the following embedded signaling buffering. After the embedded signaling is parsed, the communication terminal stores the embedded signalings to corresponding buffer regions in accordance with the control information and performs embedded signaling decoding on the embedded signalings in all of the buffer regions to acquire a control signaling when each of the buffer regions has buffered a corresponding embedded signaling. The communication terminal according to the disclosure does not need to wait until a synchronization frame is received to parse the subsequently received embedded signaling frame. Instead, the communication terminal directly parses the received embedded signaling frame and buffers the parsed embedded signaling thereby reducing the time period required for communication establishment and improving the access performance of the system.

BRIEF DESCRIPTION OF THE DRAWINGS

In order to illustrate the technical solutions according to the embodiments of the present disclosure or in the conventional art more clearly, drawings to be used in the description of the embodiments or the conventional art are described briefly hereinafter. Apparently, the drawings described hereinafter are only some embodiments of the present disclosure, and other drawings may be obtained by those skilled in the art according to those drawings without creative effort.

DETAILED DESCRIPTION OF THE EMBODIMENTS

For those skilled in the art to better understand the technical solutions of the embodiments of the disclosure, the embodiments of the disclosure will be further described in detail in conjunction with the drawings and the embodiments.

A communication establishment method based on a time division multiple access communication system provided according to the disclosure is applicable for a communication system which employs a time division multiple access technique such as a Digital Mobile Radio (DMR) system, a Trans European Trunked Radio (TETRA) system and a police trunking system.

Figure 1:
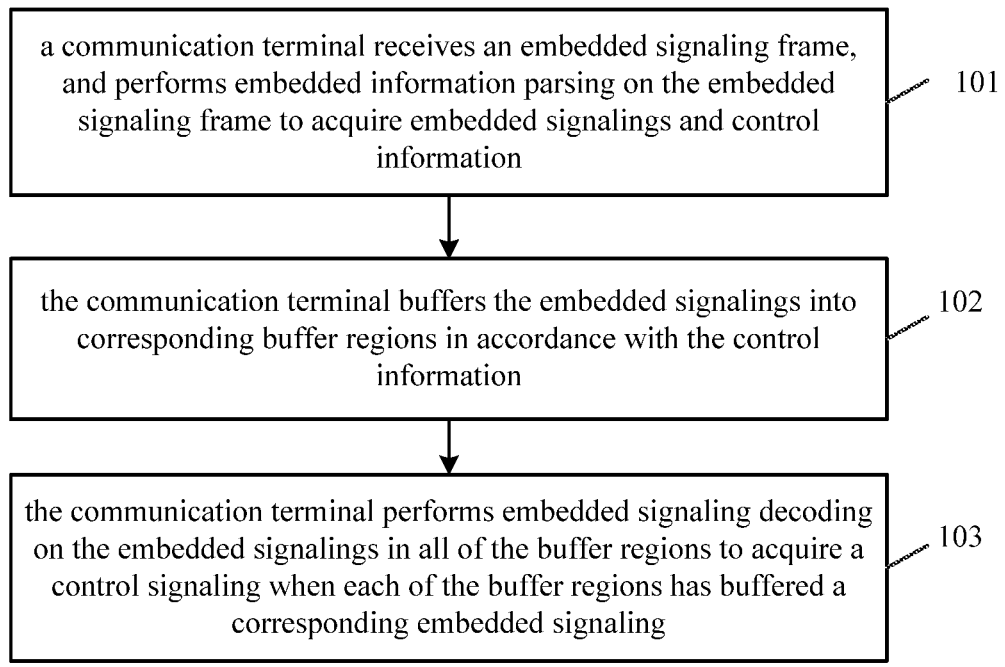
FIG. 1 is a flow chart of a communication method based on a time division multiple access communication system according to a first method embodiment of the disclosure.

Referring to FIG. 1, which shows a flow chart of a communication method based on a time division multiple access communication system according to a first method embodiment of the disclosure, the method includes the following steps 101 to 103.

In step 101, a communication terminal receives an embedded signaling frame, and performs embedded information parsing on the embedded signaling frame to acquire embedded signalings and control information.

In a time division multiple access communication system, a mobile terminal receives an embedded signaling frame transmitted by a base station, and makes a further determination in accordance with embedded signalings carried by the embedded signaling frame to proceed with normal communication, where the embedded signaling frame may include a short link control signaling frame and a voice embedded signaling frame which is also referred to as a voice super frame. Since different communication systems follow different communication standards, frame structures of the voice super frame and the short link control signaling frame defined by different communication standards may be different. For example, a position of a sub-frame carrying the embedded signaling, the number of sub-frames carrying the embedded signaling and the like may be different. In practice, an embedded signaling frame in any system includes the embedded signaling and the control information, where the control information is used for indicating a position of a corresponding embedded signaling in all of the embedded signalings.

For ease of description, hereinafter, only a DMR system is taken as an example to explain the embodiment.

In the DMR system, different manufacturers employ different embedded signaling frame structures. The following description only takes a most commonly employed voice super frame as an example to explain the embodiment. The voice super frame in DMR is composed of 6 bursts which are identified using letters A to F in sequence, where a burst A indicates a beginning of the super frame, a middle portion of the burst A is used to carry a sync word (SYNC), and middle portions of bursts B to F are used to transmit embedded singling and control information. The control information indicates link control start/stop (LCSS) indications which are identified using "beginning", "middle", "middle" and "end" in sequence, which indicates a position of the embedded signaling carried in each burst in all of the link embedded signaling.

In step 102, the communication terminal buffers the embedded signaling into corresponding buffer regions in accordance with the control information.

There are two implementations of step 102. In a first implementation, the communication terminal buffers a current embedded signaling into a buffer region corresponding to a position indicated by current control information, and adjusts a position of the buffered current embedded signaling in accordance with the position indicated by the current control information and a position indicated by next control information.

In a second implementation, the communication terminal buffers the parsed embedded signaling successively, and adjusts a position of the buffered embedded signaling in accordance with a position indicated by the control information of the embedded signaling.

In the following, the two implementations are explained in specific implementation scenarios respectively. For example, the bursts B, C, D, and E carry embedded signalings 1, 2, 3, and 4 respectively, of which the control information is identified using "beginning", "middle", "middle" and "end" respectively and correspond to buffer regions 1, 2, 3, and 4 respectively. Since it is difficult to determine which embedded signaling is to be buffered into either of the buffer region 2 and the buffer region 3, adaptive adjustment should be made in conjunction with the control information of a next embedded signaling. For example, in a case that the burst D is first received, the parsed embedded signaling 3 is buffered in the buffer region 2, then in a case that the burst E is received next, the parsed embedded signaling 4 is buffered in the buffer region 4, and the embedded signaling 2 of the previously received burst B is buffered in the buffer region 3. Of course, the four parsed embedded signalings 1, 2, 3, 4 may be buffered successively in an order of reception. Then an overall adjustment is performed on buffer positions of the embedded signalings according to control information relationships. For example, the bursts are received in the order of C, D, E, F, A, B, where the bursts C, D, E, and B carries the embedded signalings, and the embedded signaling are also buffered in the order of 2, 3, 4, 1; then buffer positions of the embedded signalings are adjusted in accordance with indications of the control information, and after the adjustment, the embedded signalings 1, 2, 3, 4 carried by bursts B, C, D, E are buffered in buffer regions 1, 2, 3, 4 respectively.

In step 103, the communication terminal performs embedded signaling decoding on the embedded signalings in all of the buffer regions to acquire a control signaling when each of the buffer regions has buffered a corresponding embedded signaling.

The buffer regions 1, 2, 3, and 4 corresponding to voice signalings 1, 2, 3, and 4 carried in the bursts B, C, D, and E respectively have buffered embedded signalings, which indicates that a condition for decoding the link control signaling is met, and the communication terminal performs embedded signaling decoding on the embedded signalings 1, 2, 3, and 4 buffered in the buffer regions 1, 2, 3, and 4 to acquire the control signaling. The communication terminal may perform further communication processing in accordance with the control signaling.

The communication method based on a time division multiple access communication system according to the embodiments of the disclosure includes a communication terminal receiving an embedded signaling frame, performing embedded information parsing on the embedded signaling frame to acquire embedded signalings and control information, and buffering the embedded signalings into corresponding buffer regions in accordance with the control information. The communication terminal does not have to perform reception and parsing processing exactly in the order from the beginning to the end as indicated by indications of the embedded signalings, but parses the received embedded signaling frame to acquire the embedded signalings carried thereby, and then buffers the embedded signalings in order to avoid a condition where a signaling frame may be discarded in a case that the embedded signaling frame is not received in the order from the beginning to the end. The communication terminal performs embedded signaling decoding on the embedded signalings in all of the buffer regions to acquire a control signaling when each of the buffer regions has buffered a corresponding embedded signaling. Such a process can reduce a communication establishment duration thereby improving the access performance of the system.

Figure 2:
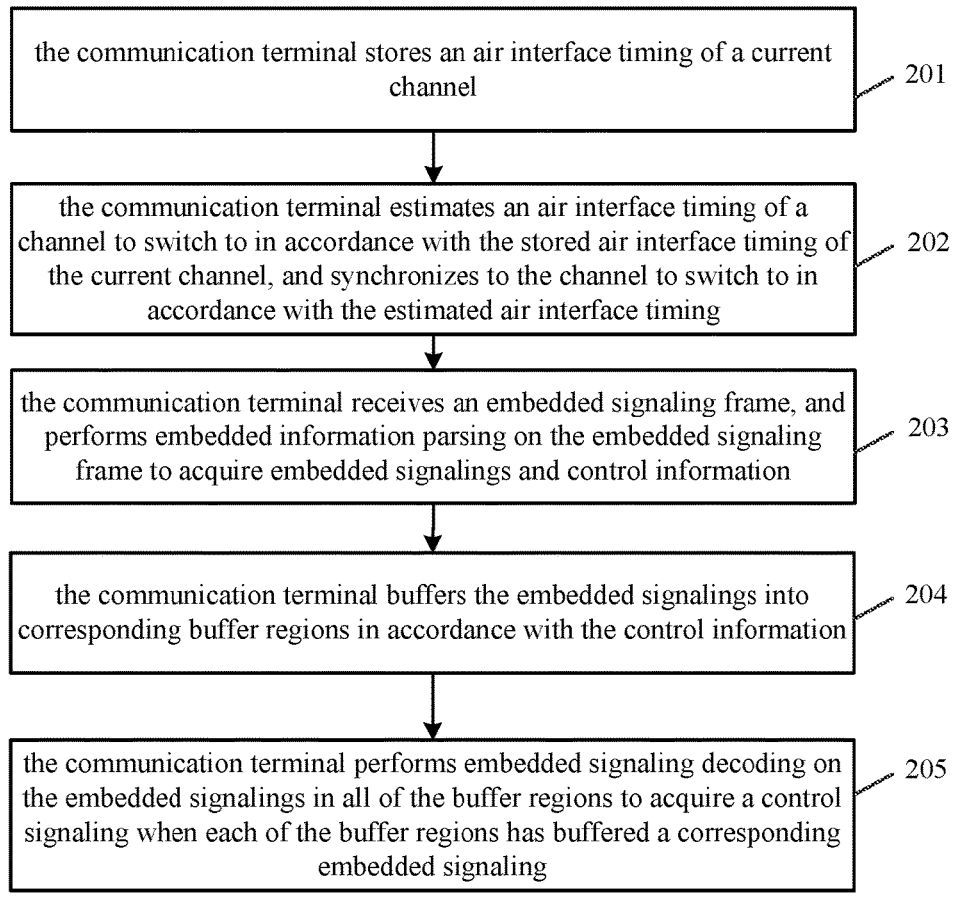
FIG. 2 is a flow chart of a communication method based on a time division multiple access communication system according to a second method embodiment of the disclosure.

Since when performing a channel switching or a channel scanning, firstly the communication terminal needs to detect a synchronization signal and adjust its own timing to be aligned with a timing of the air channel thus the embedded signaling frame may be received properly. The communication terminal synchronizes to the channel by firstly searching for an air interface timing of a channel to switch to and then adjusting its own air interface timing to be aligned with the air interface timing of the channel to switch to. This process is time consuming and may affect communication quality. A preferred scheme is provided according to the embodiments of the disclosure to reduce the time required for synchronization. Referring to FIG. 2, which shows a flow chart of a communication method based on a time division multiple access communication system according to a second method embodiment of the disclosure, the method may include the following steps 201 to 205.

In step 201, the communication terminal stores an air interface timing of a current channel.

In step 202, the communication terminal estimates an air interface timing of a channel to switch to in accordance with the stored air interface timing of the current channel, and synchronizes to the channel to switch to in accordance with the estimated air interface timing.

In the conventional digital time division multiple access communication system DMR, when a communication terminal switches to a channel 2 from a channel 1, it clears an air interface timing of the channel 1, detects an air interface timing of the channel 2, and synchronizes its reception timing to the detected air interface timing of the channel 2 thereby implementing synchronization between the communication terminal and the channel 2. Before the synchronization is detected, a physical layer will not provide data to a link layer. The physical layer transmits the received data to the link layer for processing only when the synchronization is detected, that is, the communication terminal synchronizes its reception timing to the detected air interface timing of the channel 2. In this case, the communication terminal is able to receive the embedded signaling frame. Therefore, in order to receive the embedded signaling frame rapidly, the communication terminal needs to synchronize to the channel rapidly.

In practice, preferably, the step 202 may include:

the communication terminal estimating that the air interface timing of the channel to switch to is the same as the stored air interface timing of the current channel in a case that the current channel and the channel to switch to have a same frequency and a same time slot; and the communication terminal determining the air interface timing of the channel to switch to in accordance with a time-slot relationship between the current channel and the channel to switch to in a case that the current channel and the channel to switch to have a same frequency and different time slots.

In step 203, the communication terminal receives an embedded signaling frame, and performs embedded information parsing on the embedded signaling frame to acquire embedded signalings and control information.

In step 204, the communication terminal buffers the embedded signalings into corresponding buffer regions in accordance with the control information.

In step 205, the communication terminal performs embedded signaling decoding on the embedded signalings in all of the buffer regions to acquire a control signaling when each of the buffer regions has buffered a corresponding embedded signaling.

Steps 203 to 205 are the same with the above steps 101 to 103, and thus the description is omitted herein.

With the communication method based on a time division multiple access communication system according to the embodiments of the disclosure, not only the time required for decoding the control signaling but also the time required for the communication terminal to perform synchronization can be reduced. Particularly, it is implemented by the communication terminal performing same-frequency scan while in a transition mode, or storing the air interface timing of the current channel and adaptively adjusting its air interface timing in accordance with the stored air interface timing in order to synchronize to the channel to switch to in a case of a channel having a same frequency and a different time slot. In this case, the communication terminal does not need to search for the air interface timing again thereby ensuring that the communication terminal accesses the channel as soon as possible in order to receive the embedded signaling frame rapidly.

In the above first embodiment and second embodiment, the communication terminal performs decoding and acquires a control signaling, and needs to perform further determinations in accordance with the control signaling. Different determinations are required to be made for different types of control signalings. In view of this technical problem, the following preferred scheme is provided according to the disclosure.

Based on the above first embodiment or second embodiment, in a case that the embedded signaling frame is a voice super frame, the method may further include:

the communication terminal determining whether protocol data unit information in the control signaling indicates that a voice call is directed to the communication terminal, and turning on a speaker of the communication terminal to receive the voice call in a case that the protocol data unit information indicates that the voice call is directed to the communication terminal.

Based on the above first embodiment or second embodiment, in a case that the embedded signaling frame is a common notification channel frame, the method may further include:

the communication terminal determining whether a compressed address in the link control signaling is a compressed address of the communication terminal, and scanning a next channel in a case that the compressed address is not the compressed address of the communication terminal.

By processing with the above method, the communication terminal is able to rapidly determine whether to receive a call or be informed of a forwarding condition of a downlink channel in advance thereby improving communication quality of the system.

Figure 3:
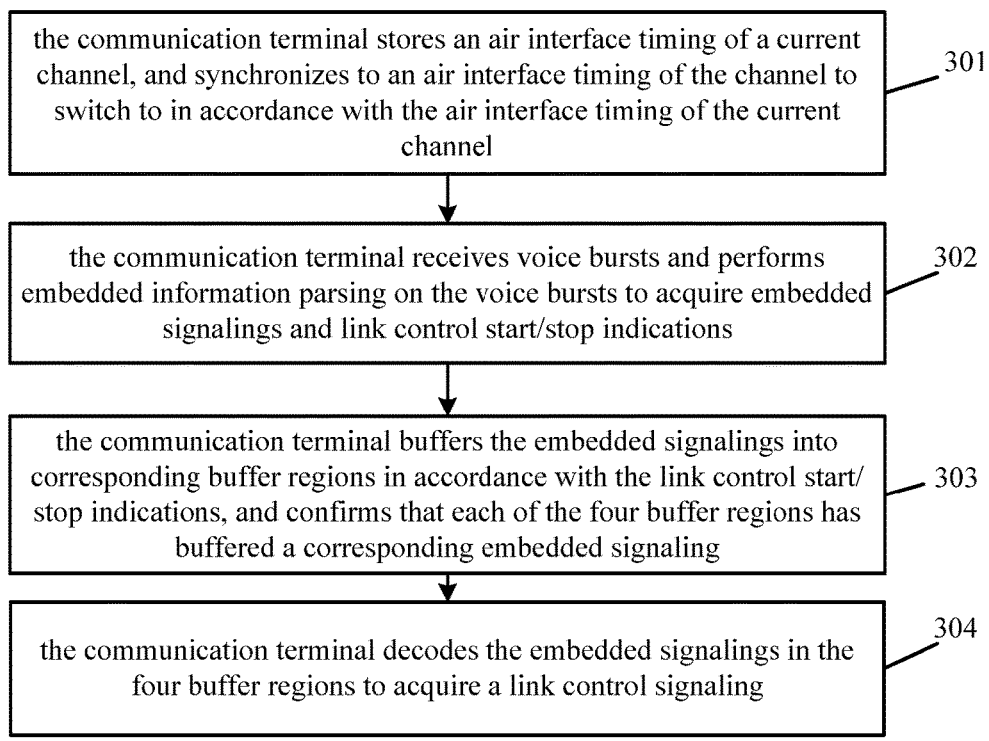
FIG. 3 is a flow chart of a communication method based on a time division multiple access communication system according to a third method embodiment of the disclosure.

Hereinafter, an application scenario of voice late entry is taken as an example to further explain the communication method according to the disclosure. To describe advantageous effects of the embodiments of the disclosure more clearly, a processing scheme for voice late entry in a conventional DMR system is described briefly for comparative analysis. The scheme includes the following steps. When performing a channel switching, the communication terminal should find a synchronization burst A since the burst A is needed to perform voice synchronization, and bursts B, C, D, E and F are able to be received when the air interface timing is synchronized. The embedded signaling frame is parsed to acquire link control start/stop (LCSS) indications in embedded signaling regions, and the bursts are successively received in an order of "beginning", "middle", "middle" and "end" as indicated by LCSS indication. When all of the four embedded signalings are received, embedded signaling decoding is performed to restore a link control header. The communication terminal determines whether a voice call is directed to the communication terminal in accordance with protocol data unit information in the link control header, and turns on a speaker of the communication terminal to receive the voice call in a case that the voice call is directed to the communication terminal. A control method for voice late entry according to the embodiments of the disclosure is shown in FIG. 3, which is a flow chart of a communication method based on a time division multiple access communication system according to a third method embodiment of the disclosure. The method may include the following steps 301 to 304.

In step 301, the communication terminal stores an air interface timing of a current channel, and synchronizes to an air interface timing of the channel to switch to in accordance with the air interface timing of the current channel.

In the conventional digital time division multiple access communication system DMR, when a communication terminal switches to a channel 2 from a channel 1, it clears an air interface timing of the channel 1, detects an air interface timing of the channel 2, and synchronizes its reception timing to the detected air interface timing of the channel 2 thereby implementing synchronization between the communication terminal and the channel 2. Before the synchronization is detected, a physical layer will not provide data to a link layer. The physical layer transmits the received data to the link layer for processing only when the synchronization is detected, that is, the communication terminal synchronizes its reception timing to the detected air interface timing of the channel 2. In this case, the communication terminal is able to receive voice bursts.

In this step, the synchronization between the communication terminal and the channel to switch to may be implemented with the following steps:

the communication terminal stores the air interface timing of the current channel, and determines whether the current channel and the channel to switch to have a same frequency and different time slots;

the communication terminal synchronizes to the channel to switch to in accordance with the stored air interface timing of the current channel in a case that the current channel and the channel to switch to have a same frequency and a same time slot; and the communication terminal adds 30 ms to the stored air interface timing of the current channel and synchronizes to the channel to switch to in a case that the current channel and the channel to switch to have a same frequency and different time slots.

A DMR time division multiple access communication system having 2 time slots is taken as an example. A channel currently accessed by the communication terminal is a channel 1, and a channel to switch to is a channel 2. When the communication terminal accesses the channel 1, the communication terminal synchronizes a reception timing to a timing of the air interface time slot 1, and receives a voice or data only in the time slot 1. When the communication terminal needs to switch to the channel 2, the reception timing of the communication terminal may remain unchanged in a case that the channel 1 and the channel 2 have a same frequency and a same time slot. That is, the communication terminal may synchronizes to the channel 2 in accordance with the stored reception timing synchronized to the channel 1 thus there is no need to detect synchronization to acquire the air interface timing of the channel 2.

In a case that the channel 1 and the channel 2 have a same frequency and different time slots, since a difference between the air interface timing of the time slot 2 of the channel 2 and the air interface timing of the time slot 1 of the channel 1 is 30 ms, the reception timing of the air interface of the channel 2 may be acquired by moving the stored reception timing of the air interface of the channel 1 rightwards by 30 ms. In such a case where air interface timing of the current channel is known, even if a voice synchronization burst A is not detected, a voice burst can still be received and embedded information parsing can be performed thereon thereby ensuring that the communication terminal may receive the call as soon as possible.

In step 302, the communication terminal receives voice bursts and performs embedded information parsing on the voice bursts to acquire embedded signalings and link control start/stop (LCSS) indications.

In DMR, a voice super frame is composed of 6 voice bursts which are identified using letters A, B, C, D, E and F. The voice is cyclically transmitted in an order of A, B, C, D, E and F. A burst A carrying synchronization information is referred to as a synchronization burst. Four of the bursts B, C, D, E and F carry embedded signalings, and each of the four voice bursts carries a link control start/stop (LCSS) indication, which is used for indicating that a position of the voice burst in an entire voice super frame is one of the beginning, the middle, and the end. For example, each of the bursts B, C, D, and E carries an embedded signaling and an LCSS indication, and an embedded signaling field of the burst F is empty. As another example, each of the bursts B, D, E, and F carries an embedded signaling and an LCSS indication, and an embedded signaling field of the burst C is empty. Of course, different manufacturers employ different standards, which is not particularly limited in the embodiment.

To facilitate understanding of the scheme of the embodiments of the disclosure, in the following, it is taken as an example for illustration that each of the bursts B, C, D, and E carries an embedded signaling, and an embedded signaling field of the burst F is empty.

In a case that the voice burst B is received first, the following processing are successively performed in an order where voice bursts are received:

the burst B is parsed to acquire an embedded signaling 1 and an LCSS indication of 1 which indicates that the embedded signaling 1 is a first piece of the embedded signaling, that is, the LCSS indication is the beginning;

the burst C is parsed to acquire an embedded signaling 2 and an LCSS indication of 3 which indicates that the embedded signaling 2 is a middle piece of the embedded signaling, that is, the LCSS indication is the middle;

the burst D is parsed to acquire an embedded signaling 3 and an LCSS indication of 3 which indicates that the embedded signaling 3 is a middle piece of the embedded signaling, that is, the LCSS indication is the middle; and the burst E is parsed to acquire an embedded signaling 4 and an LCSS indication of 2 which indicates that the embedded signaling 4 is a last piece of the embedded signaling, that is, the LCSS indication is the end.

In step 303, the communication terminal buffers the embedded signaling into corresponding buffer regions in accordance with the link control start/stop indications, and confirms that each of the four buffer regions has a buffered corresponding embedded signaling.

Preferably, step 303 may include:

buffering the embedded signaling into a first buffer region in a case that the LCSS indication is the beginning;

buffering the embedded signaling into a second buffer region in a case that the LCSS indication is the middle, and a next LCSS indication is the middle;

buffering the embedded signaling into a third buffer region in a case that the LCSS indication is the middle, and a next LCSS indication is the end; and buffering the embedded signaling into a fourth buffer region in a case that the LCSS indication is the end and confirming that each of the four buffer regions has buffered a corresponding embedded signaling.

After the received voice bursts is parsed to acquire the LCSS indication in accordance with step 2, the above operation performed in accordance with step 303 may include: buffering the embedded signaling 1 into a first buffer region in a case that the LCSS indication of the first burst is the beginning; buffering the embedded signaling 2 into a second buffer region, in a case that the LCSS indication of the second burst is the middle, and the LCSS indication of a next burst is the middle; buffering the embedded signaling 3 into a third buffer region, in a case that the LCSS indication of the third burst is the middle, and the LCSS indication of a next burst is the end; and buffering the embedded signaling 4 into a fourth buffer region, in a case that the LCSS indication of the fourth burst is the end.

Since the LCSS indications of two voice bursts in the voice super frame indicate the middle, the LCSS indication of a next burst is needed to make a determination and adjustment thereby accurately buffering the embedded signaling carried by each of the bursts into a corresponding buffer region.

For example, the burst D, of which the LCSS indication is the middle, is received first, and the embedded signaling is buffered into the second buffer region; then the burst E, of which the LCSS indication is the end, is received, and the embedded signaling in the burst E is buffered into the fourth buffer region. In this case, the third buffer region is empty and the fourth buffer region is filled, which indicates the burst D is buffered into a wrong buffer region, data stored in the second buffer region needs to be copied to the third buffer region and the second buffer region needs to be cleared simultaneously. That is, the buffer region of the embedded signaling needs to be adjusted in accordance with the LCSS indication of the next burst in a case that the LCSS indication is the middle. Afterwards, bursts F, A, B, and C are received successively. The embedded signaling carried by the burst B is buffered into the first buffer region in a case that the LCSS indication of the burst B is the beginning, and the embedded signaling carried by the burst C is buffered into the second buffer region in a case that the LCSS indication of the burst C is the middle. At this point, each of the four buffer regions has buffered a corresponding embedded signaling.

In step 304, the communication terminal decodes the embedded signalings in the four buffer regions to acquire a link control signaling.

The embedded signaling buffered in each of the buffer regions has a length of 32 bits, and the embedded signalings buffered in the four buffer regions have a total length of 128 bits. The link control signaling having a length of 72 bits is generated by decoding the embedded signaling having a length of 128 bits.

Figure 4:
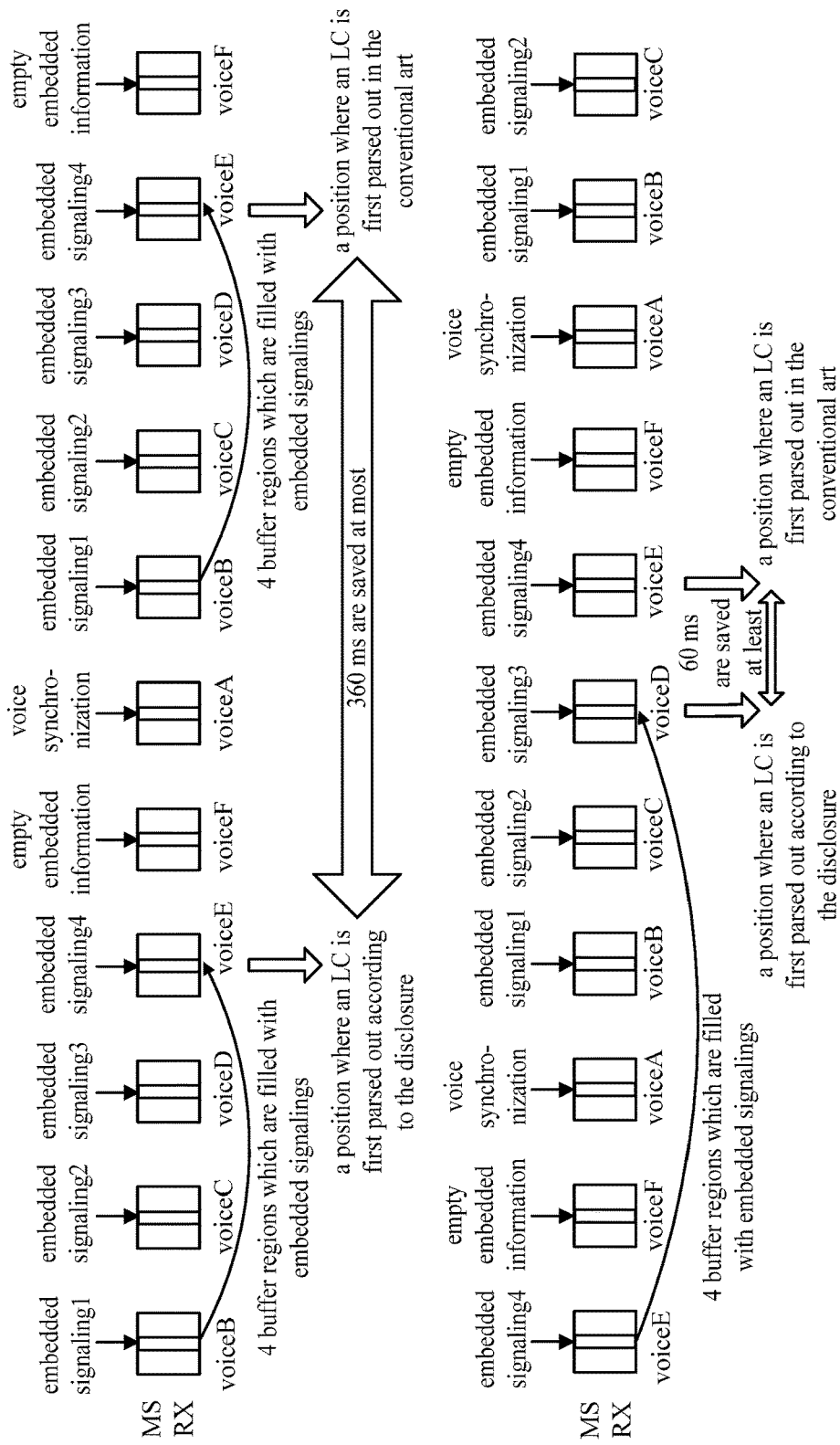
FIG. 4 is a schematic diagram showing a comparison between the conventional art and the technical solution disclosed according to the disclosure.

To describe advantageous effects of the above embodiments of the disclosure more clearly, the scheme according to the above embodiment of the disclosure is analyzed and compared with a communication establishment scheme in the conventional art. Reference is made to FIG. 4, which is a schematic diagram showing a comparison between the conventional art and the scheme according to the disclosure.

According to the scheme in the conventional art, a burst A carrying synchronization information should be found first, then subsequent bursts are received and parsed. In a case that a burst B is received first, subsequent bursts should be received in an order of C, D, E, F, A, B, C, D and E; then the bursts may be parsed to acquire the embedded signalings of which the LCSS indications are "beginning", "middle", "middle" and "end"; finally, the four embedded signalings are decoded to generate the link control signaling. As shown in FIG. 4, as compared with the conventional art, 360 ms may be saved using the scheme according to the disclosure if the burst B is received first, and 60 ms may be saved using the scheme according to the disclosure if the burst E is received first.

As can be seen, according to the embodiments of the disclosure, the communication terminal directly parses the received voice bursts to acquire the embedded signalings, and buffers the embedded signalings into corresponding buffer regions according to LCSS indications of the embedded signalings, and performs embedded signaling decoding to acquire the link control signaling when four buffering regions are filled. In a case that the timing of the air interface is known, there is no need to search for the burst A which carries the synchronization information or wait until the burst A is received to parse the received bursts which carry the embedded signalings. Instead, the received voice bursts are parsed directly, and the embedded signalings acquired by parsing are buffered. Therefore, according to the disclosure, the time required for communication establishment may be reduced.

Hereinafter, the disclosure is described by taking an application scenario of priority retrace as an example. The priority retrace includes the following procedures: the communication terminal currently accesses a channel F1 and retraces a channel F2 with a higher priority when a priority retrace timer times out; if there is a call with a higher priority directed to the communication terminal in the channel F2, the communication terminal receives the call in the channel F2 and switches back to the channel F1 when the call is finished; and if there is no call with a higher priority directed to the communication terminal in the channel F2, the communication terminal switches to the channel F1 to continue to receive the voice call, and retraces the channel F2 again until a next retrace interval arrives. In the priority retrace scheme in the conventional art, the communication quality is affected since the voice call is interrupted for a long time. In view of this technical problem, the following preferred scheme is provided according to the disclosure for reducing the interruption duration in the voice call during the priority retrace thereby ensuring the communication quality.

Figure 5:
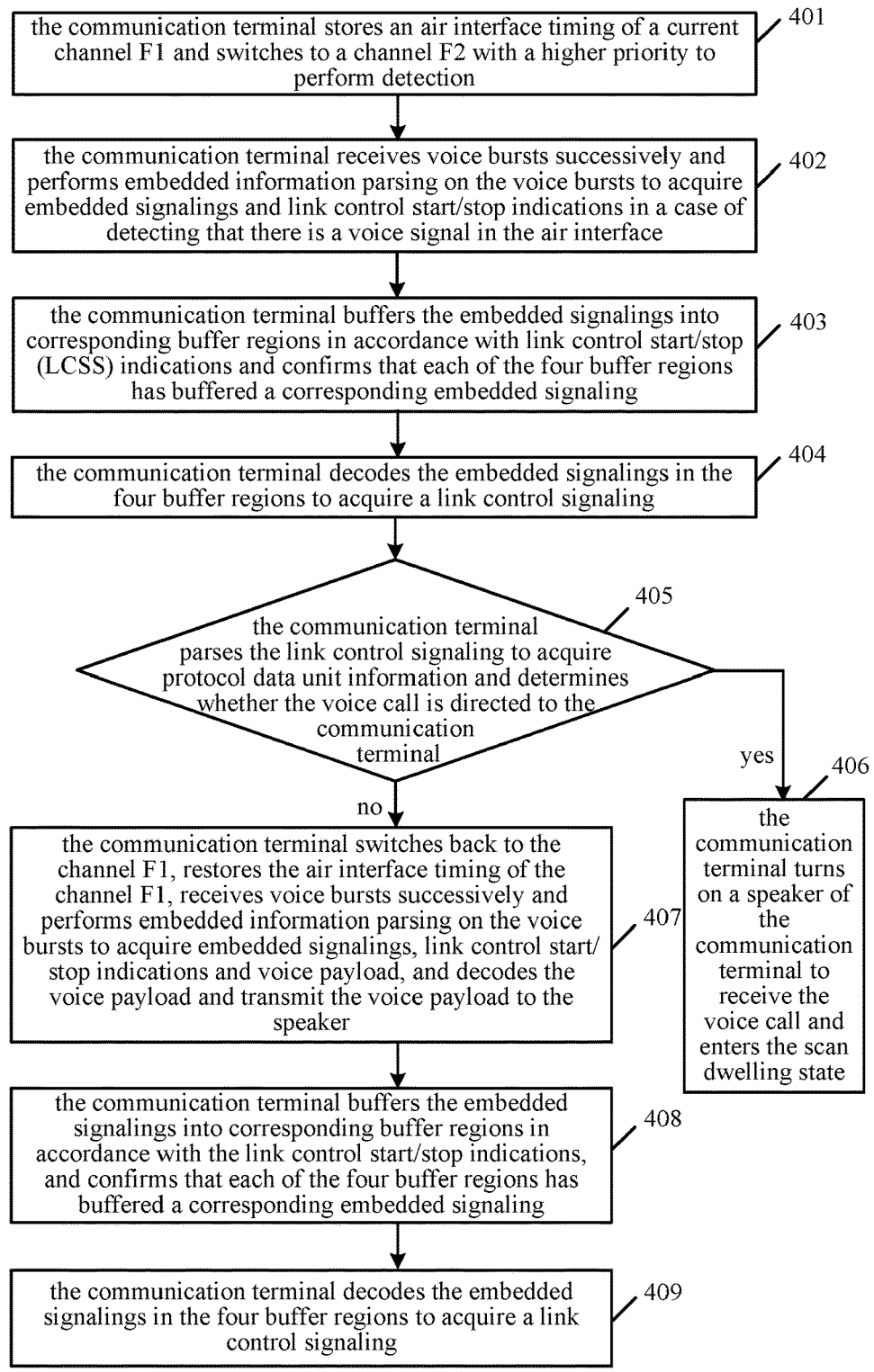
FIG. 5 is a flow chart of a communication method based on a time division multiple access communication system according to a fourth method embodiment of the disclosure.

Referring to FIG. 5, which shows a flow chart of a communication method based on a time division multiple access communication system according to a fourth method embodiment of the disclosure, the method may include the following steps 401 to 409.

In step 401, the communication terminal stores an air interface timing of a current channel F1 and switches to a channel F2 with a higher priority to perform detection.

After initiating a scan, in a case of detecting that there is a voice call directed to the communication terminal in the channel F1, the communication terminal stops scanning and turns on a speaker to receive and plays the voice. Meanwhile, the communication terminal switches its state to a scan dwelling state and starts the priority retrace timer. When the priority retrace timer times out, the communication terminal stores the air interface timing of the current channel F1 and then performs priority retrace. Then the communication terminal switches to the channel F2 with a higher priority to perform detection and switches its state to a priority retrace state simultaneously.

In step 402, the communication terminal receives voice bursts successively and performs embedded information parsing on the voice bursts to acquire embedded signalings and link control start/stop (LCSS) indications in a case of detecting that there is a voice signal in the air interface.

In step 403, the communication terminal buffers the embedded signalings into corresponding buffer regions in accordance with link control start/stop (LCSS) indications and confirms that each of the four buffer regions has buffered a corresponding embedded signaling.

In step 404, the communication terminal decodes the embedded signalings in the four buffer regions to acquire link control signaling.

In step 405, the communication terminal parses the link control signaling to acquire protocol data unit information and determines whether the voice call is directed to the communication terminal in accordance with the protocol data unit information.

In step 406, the communication terminal turns on a speaker of the communication terminal to receive the voice call and enters the scan dwelling state in a case that the voice call is directed to the communication terminal.

In step 407, the communication terminal switches back to the channel F1, restores the air interface timing of the channel F1, receives voice bursts successively and performs embedded information parsing on the voice bursts to acquire embedded signalings, link control start/stop (LCSS) indications and a voice payload, and decodes the voice payload and transmit the voice payload to the speaker, in a case that the voice call is not directed to the communication terminal.

In the conventional art, the communication terminal instructs to turn on the speaker and transmits the voice payload of a next voice burst to the speaker when the next voice burst is received only in a case that the protocol data unit information in the link control signaling is parsed out and it is determined that the voice call is directed to the communication terminal. For example, the communication terminal receives bursts A, B, C, D, E and F; only when the protocol data unit information in the link control signaling is parsed out from the burst E and it is determined that the voice call is directed to the communication terminal, the communication terminal instructs to turn on the speaker; and only when the burst F is received, the communication terminal decodes voice information at both sides of the burst F and transmits it to the speaker.

In this embodiment, there is no need to wait until the protocol data unit information in the link control signaling is parsed out and it is determined that the voice call is directed to the communication terminal to instruct to turn on the speaker. Instead, the communication terminal decodes the voice payload which is parsed out and transmits the voice payload to the speaker after synchronizing to the channel F1 thus the communication terminal is able to receive the voice call rapidly when switching back to the channel F1.

In step 408, the communication terminal buffers the embedded signalings into corresponding buffer regions in accordance with the link control start/stop indications, and confirms that each of the four buffer regions has buffered a corresponding embedded signaling.

In step 409, the communication terminal decodes the embedded signalings in the four buffer regions to acquire link control signaling.

As can be seen from the above embodiment, with the communication method according to the disclosure, there is no need for the communication terminal to perform resynchronization and wait for a synchronization frame when the communication terminal switches a channel, thus the voice bursts may be received timely thereby greatly reducing the interruption duration in the voice call.

Hereinafter, the disclosure is explained by taking an application scenario of late entry of a short link control signaling as an example. Firstly, an access scheme of short link control signaling in the conventional art is introduced briefly. In the conventional scheme, the communication terminal initiates a scan, and successively receives 4 common announcement channel (CACH) frames (each voice or data burst having a length of 30 ms carries a CACH frame) in an order of "beginning", "middle", "middle" and "end" as indicated by LCSS indication when an intermediate channel is scanned; the communication terminal performs embedded information parsing on the CACH frames to acquire the short embedded signalings; the communication terminal parses the 4 short embedded signalings which are received sequentially to acquire the short link control signaling, determines whether a compressed address carried in the short link control signaling is a compressed address of the communication terminal, and scans a next channel in a case that the voice call is not directed to the communication terminal. The following preferred scheme is provided according to the embodiments of the disclosure for reducing accessing duration of the short link control signaling and improving scanning performance.

Figure 6:
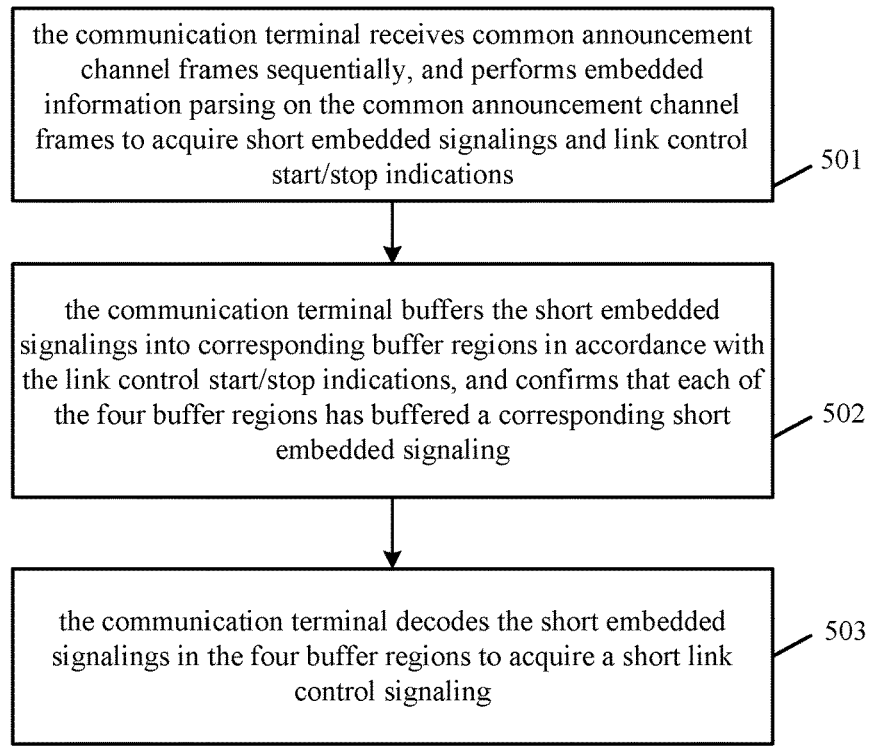
FIG. 6 is a flow chart of a communication method based on a time division multiple access communication system according to a fifth method embodiment of the disclosure.

Referring to FIG. 6, which shows a flow chart of a communication method based on a time division multiple access communication system according to a fifth method embodiment of the disclosure, the method may include the following steps 501 to 503.

In step 501, the communication terminal receives common announcement channel frames sequentially, and performs embedded information parsing on the common announcement channel frames to acquire short embedded signalings and link control start/stop (LCSS) indications.

In step 502, the communication terminal buffers the short embedded signalings into corresponding buffer regions in accordance with the link control start/stop (LCSS) indications, and confirms that each of the four buffer regions has buffered a corresponding short embedded signaling.

Step 502 may include:

the communication terminal buffering the short embedded signaling into a first buffer region in a case that the LCSS indication is the beginning;

the communication terminal buffering the short embedded signaling into a second buffer region in a case that the LCSS indication is the middle, and a next LCSS indication is the middle;

the communication terminal buffering the short embedded signaling into a third buffer region in a case that the LCSS indication is the middle, and a next LCSS indication is the end;

the communication terminal buffering the short embedded signaling into a fourth buffer region in a case that the LCSS indicates the end; and the communication terminal confirming that each of the four buffer regions has buffered corresponding short embedded signaling.

For example, in a case that an LCSS indication acquired by parsing a first received CACH frame is the middle, and an LCSS indication of a next received CACH frame is the middle, the embedded signaling of the first received CACH frame is buffered in the second buffer region, and the embedded signaling of the second received CACH frame is buffered in the third buffer region.

In step 503, the communication terminal decodes the short embedded signaling in the four buffer regions to acquire short link control signaling.

Preferably, the method may further include:

the communication terminal parsing the short link control signaling to acquire a compressed address in the short link control signaling, determining whether the compressed address is a compressed address of the communication terminal, and scanning a next channel in a case that the compressed address is not the compressed address of the communication terminal.

To describe advantageous effects of the above embodiment of the disclosure more clearly, a processing scheme for parsing the CACH frame and acquiring short LC in the conventional art is described briefly for comparative analysis.

In the conventional scheme, in a case that an LCSS indication acquired by parsing a first received CACH frame is the middle, no signaling is buffered and no processing is performed. After that, LCSS indications acquired by parsing subsequent CACH frames are middle and end sequentially, no signaling is buffered and no processing is performed. When the communication terminal parses the fourth received CACH frame and acquires an LCSS indication which is the beginning, the communication terminal parses subsequently received CACH frames and decodes the short embedded signalings in four received CACH frames in an order of "beginning", "middle", "middle" and "end" as indicated by the LCSS indications to acquire a short link control signaling. As can be seen, in the conventional art, in this case, 7 CACH frames are required to be received to perform decoding and acquire the short link control signaling; while with the scheme of the present disclosure, only 4 CACH frames are required to be received to perform decoding and acquire the short link control signaling. In comparison, with the disclosure, an access duration of the short LC in the CACH frame may be reduced.

Figure 7:
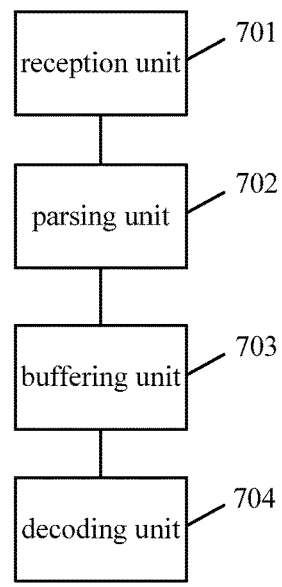
FIG. 7 is a schematic structural diagram of a communication terminal based on a time division multiple access communication system according to a first device embodiment of the disclosure.

Corresponding to the communication method based on a time division multiple access communication system according to the first method embodiment of the disclosure, a communication terminal based on a time division multiple access communication system is provided according to the embodiments of the disclosure. Referring to FIG. 7, which shows a schematic structural diagram of a communication terminal based on a time division multiple access communication system according to a first device embodiment of the disclosure, the communication terminal may include: a reception unit 701, a parsing unit 702, a buffering unit 703 and a decoding unit 704. In the following, their internal structures and connection relationships are further described in conjunction with an operation principle of the device.

The reception unit 701 is configured to receive an embedded signaling frame.

The parsing unit 702 is configured to perform embedded information parsing on the embedded signaling frame to acquire embedded signalings and control information.

The buffering unit 703 is configured to buffer the embedded signalings into corresponding buffer regions in accordance with the control information.

The decoding unit 704 is configured to perform embedded signaling decoding on the embedded signalings in all of the buffer regions to acquire a control signaling when each of the buffer regions has buffered a corresponding embedded signaling.

Preferably, the buffering unit may include:

a first storage module configured to buffer a current embedded signaling into a buffer region corresponding to a position indicated by current control information; and a first adjustment module configured to adjust a position of the buffered current embedded signaling in accordance with the position indicated by the current control information and a position indicated by next control information.

Preferably, the buffering unit may include:

a second storage module configured to buffer the embedded signaling which is parsed out successively; and a second adjustment module configured to adjust a position of the buffered embedded signaling in accordance with the position indicated by the control information of the embedded signaling.

Preferably, in a case that the embedded signaling frame is a voice super frame, the terminal may further include:

a first determination unit configured to determine whether protocol data unit information in the control signaling indicates that a voice call is directed to the communication terminal; and a first control unit configured to turn on a speaker of the communication terminal to receive the voice call in a case that the protocol data unit information indicates that the voice call is directed to the communication terminal.

Preferably, in a case that the embedded signaling frame is a common notification channel frame, the terminal may further include:

a second determination unit configured to determine whether a compressed address in the link control signaling is a compressed address of the communication terminal; and a second control unit configured to scan a next channel in a case that the compressed address is not the compressed address of the communication terminal.

As can be seen from the above embodiments of the disclosure, a communication terminal receives an embedded signaling frame, performs embedded information parsing on the embedded signaling frame to acquire embedded signalings and control information, and buffers the embedded signalings into corresponding buffer regions in accordance with the control information. The communication terminal does not have to perform reception and parsing processing exactly in the order from the beginning to the end as indicated by indications of the embedded signaling, but parses the embedded signaling frame on reception of the embedded signaling frame to acquire the embedded signalings carried thereby, and then buffers the embedded signalings in order to avoid a condition where a signaling frame may be discarded in a case that the embedded signaling frame is not received in the order from the beginning to the end. The communication terminal performs embedded signaling decoding on the embedded signalings in all of the buffer regions to acquire control signaling when each of the buffer regions has buffered a corresponding embedded signaling. Such a process can reduce the time required for decoding the control signaling thereby improving the communication quality.

Figure 8:
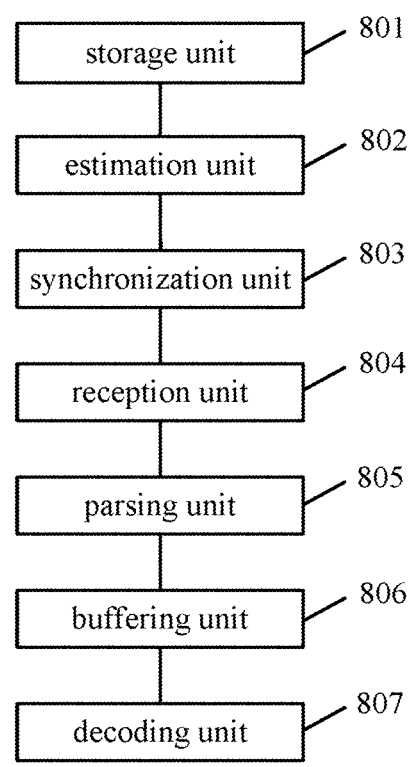
FIG. 8 is a schematic structural diagram of a communication terminal based on a time division multiple access communication system according to a second device embodiment of the disclosure.

Corresponding to the communication method based on a time division multiple access communication system according to the second method embodiment of the disclosure, a communication terminal based on a time division multiple access communication system is provided according to the embodiments of the disclosure. Referring to FIG. 8, which shows a schematic structural diagram of a communication terminal based on a time division multiple access communication system according to a second device embodiment of the disclosure, the communication terminal may include: a storage unit 801, an estimation unit 802, a synchronization unit 803, a reception unit 804, a parsing unit 805, a buffering unit 806 and a decoding unit 807. In the following, their internal structures and connection relationships are further described in conjunction with an operation principle of the device.

The storage unit 801 is configured to store an air interface timing of a current channel.

The estimation unit 802 is configured to estimate an air interface timing of a channel to switch to in accordance with the stored air interface timing of the current channel.

The synchronization unit 803 is configured to synchronize to the channel to switch to in accordance with the estimated air interface timing.

The reception unit 804 is configured to receive an embedded signaling frame.

The parsing unit 805 is configured to perform embedded information parsing on the embedded signaling frame to acquire embedded signalings and control information.

The buffering unit 806 is configured to buffer the embedded signalings into corresponding buffer regions in accordance with the control information.

The decoding unit 807 is configured to perform embedded signaling decoding on the embedded signalings in all of the buffer regions to acquire control signaling when each of the buffer regions has buffered a corresponding embedded signaling.

The above 804 to 807 are the same as the 701 to 704 in the above embodiment, and the detailed description thereof will be omitted.

The estimation unit may include:

a first estimation module configured to estimate that the air interface timing of the channel to switch to is the same as the stored air interface timing of the current channel in a case that the current channel and the channel to switch to have a same frequency and a same time slot; and a second estimation module configured to determine the air interface timing of the channel to switch to in accordance with a time-slot relationship between the current channel and the channel to switch to in a case that the current channel and the channel to switch to have a same frequency and different time slots.

The communication terminal according to the embodiments of the disclosure is capable of reducing not only the time required for decoding the control signaling but also the time required for the communication terminal to perform channel synchronization specifically by performing same-frequency scan in a transition mode, or storing the air interface timing of the current channel and making adaptive adjustment in accordance with the stored air interface timing in order to synchronize to the channel to switch to in a case of a channel having a same frequency and a different time slot, thereby enabling the communication terminal to access to the channel rapidly, thus the access duration may be reduced.

It should be noted that, in the present disclosure, relational terms such as "first" and "second" are used only to distinguish one entity or operation from the other entity or operation, but not necessarily demand or imply that there is actual relation or order among those entities and operations. Furthermore, the terms "including", "containing", or any other variations thereof mean a non-exclusive inclusion, so that the process, apparatus, article or device that includes a series of elements includes not only these elements but also other elements that are not explicitly listed, or further includes elements inherent in the process, apparatus, article or device. Moreover, when there is no further limitation, the element defined by the wording "include(s) a . . . " does not exclude the case that in the process, apparatus, article or device that includes the element there are other same elements.

It should also be noted that those skilled in the art could clearly understand that a part or the whole of the process in the embodiments of the above-mentioned device may be implemented by related hardware instructed by computer program. The program may be stored in a computer readable storage medium. When being executed, the program may include the process in the embodiments of the above-mentioned method. The storage medium may be a magnetic disk, an optical disk, a read-only memory (ROM) or a random access memory (RAM) and so on.

The communication method and the terminal based on a time division multiple access communication system according to the disclosure are described as above. The principles and the embodiments of the invention are described herein by using specific embodiment. However, the description of the above-mentioned embodiments is only for helping to understand the method and the core concept of the invention. Moreover, for the skilled in the art, modifications may be made to the embodiments and the applications in the light of the concept of the invention. As a result, the content in this application should not be understood as limiting the present invention.

The invention claimed is:

1. A communication method based on a time division multiple access communication system, comprising:

storing, by the communication terminal, an air interface timing of a current channel;

estimating, by the communication terminal, an air interface timing of a channel to switch to in accordance with the stored air interface timing of the current channel; and synchronizing, by the communication terminal, to the channel to switch to in accordance with the estimated air interface timing;

receiving, by a communication terminal, an embedded signaling frame, and performing, by the communication terminal, embedded information parsing on the embedded signaling frame to acquire embedded signalings and control information;

buffering, by the communication terminal, the embedded signalings into corresponding buffer regions in accordance with the control information; and performing, by the communication terminal, embedded signaling decoding on the embedded signalings in all of the buffer regions to acquire a control signaling when each of the buffer regions has buffered a corresponding embedded signaling, wherein the estimating, by the communication terminal, the air interface timing of the channel to switch to in accordance with the stored air interface timing of the current channel comprises:

estimating, by the communication terminal, that the air interface timing of the channel to switch to is the same as the stored air interface timing of the current channel, in a case that the current channel and the channel to switch to have a same frequency and a same time slot; and determining, by the communication terminal, the air interface timing of the channel to switch to, in accordance with a time-slot relationship between the current channel and the channel to switch to, in a case that the current channel and the channel to switch to have a same frequency and different time slots.

2. The method according to claim 1, wherein the buffering, by the communication terminal, the embedded signalings into the corresponding buffer regions in accordance with the control information comprises:

buffering, by the communication terminal, a current embedded signaling into a buffer region corresponding to a position indicated by current control information; and adjusting, by the communication terminal, a position of the buffered current embedded signaling in accordance with the position indicated by the current control information and a position indicated by next control information.

3. The method according to claim 2, wherein before the receiving, by the communication terminal, the embedded signaling frame, the method further comprises:

storing, by the communication terminal, an air interface timing of a current channel; and estimating, by the communication terminal, an air interface timing of a channel to switch to in accordance with the stored air interface timing of the current channel; and synchronizing, by the communication terminal, to the channel to switch to in accordance with the estimated air interface timing.

4. The method according to claim 2, wherein in a case that the embedded signaling frame is a voice super frame, the method further comprises:

determining, by the communication terminal, whether protocol data unit information in the control signaling indicates that a call is directed to the communication terminal; and turning on, by the communication terminal, a speaker of the communication terminal to receive the voice call, in a case that the protocol data unit information indicates that the call is directed to the communication terminal.

5. The method according to claim 2, wherein in a case that the embedded signaling frame is a common notification channel frame, the method further comprises:

determining, by the communication terminal, whether a compressed address in the link control signaling is a compressed address of the communication terminal; and scanning, by the communication terminal, a next channel in a case that the compressed address is not the compressed address of the communication terminal.

6. The method according to claim 1, wherein in a case that the embedded signaling frame is a voice super frame, the method further comprises:

determining, by the communication terminal, whether protocol data unit information in the control signaling indicates that a call is directed to the communication terminal; and turning on, by the communication terminal, a speaker of the communication terminal to receive the voice call, in a case that the protocol data unit information indicates that the call is directed to the communication terminal.

7. The method according to claim 1, wherein in a case that the embedded signaling frame is a common notification channel frame, the method further comprises:

determining, by the communication terminal, whether a compressed address in the link control signaling is a compressed address of the communication terminal; and scanning, by the communication terminal, a next channel in a case that the compressed address is not the compressed address of the communication terminal.

8. A communication terminal based on a time division multiple access communication system, comprising a processor and a memory having code instructions stored therein, wherein when the code instructions are executed by the processor, the processor is configured to:

store an air interface timing of a current channel;

estimate an air interface timing of a channel to switch to in accordance with the stored air interface timing of the current channel;

synchronize to the channel to switch to in accordance with the estimated air interface timing;

receive an embedded signaling frame;

perform embedded information parsing on the embedded signaling frame to acquire embedded signalings and control information;

buffer the embedded signalings into corresponding buffer regions in accordance with the control information; and perform embedded signaling decoding on the embedded signalings in all of the buffer regions to acquire a control signaling when each of the buffer regions has buffered a corresponding embedded signaling, wherein the processor is configured to estimate an air interface timing of a channel to switch to in accordance with the stored air interface timing of the current channel by:

estimating that the air interface timing of the channel to switch to is the same as the stored air interface timing of the current channel in a case that the current channel and the channel to switch to have a same frequency and a same time slot; and determining the air interface timing of the channel to switch to in accordance with a time-slot relationship between the current channel and the channel to switch to in a case that the current channel and the channel to switch to have a same frequency and different time slots.

9. The terminal according to claim 8, wherein the processor is further configured to:

buffer a current embedded signaling into a buffer region corresponding to a position indicated by current control information; and adjust a position of the buffered current embedded signaling in accordance with the position indicated by the current control information and a position indicated by next control information.

10. The terminal according to claim 9, wherein the processor is further configured to:
store an air interface timing of a current channel;
estimate an air interface timing of a channel to switch to in accordance with the stored air interface timing of the current channel; and
synchronize to the channel to switch to in accordance with the estimated air interface timing.

11. The terminal according to claim 9, wherein in a case that the embedded signaling frame is a voice super frame, the processor is further configured to:
determine whether protocol data unit information in the control signaling indicates that a call is directed to the communication terminal; and
turn on a speaker of the communication terminal to receive the voice call in a case that the protocol data unit information indicates that the call is directed to the communication terminal.

12. The terminal according to claim 9, wherein in a case that the embedded signaling frame is a common notification channel frame, the processor is further configured to:
determine whether a compressed address in the link control signaling is a compressed address of the communication terminal; and
scan a next channel in a case that the compressed address is not the compressed address of the communication terminal.

13. The terminal according to claim 8, wherein in a case that the embedded signaling frame is a voice super frame, the processor is further configured to:
determine whether protocol data unit information in the control signaling indicates that a call is directed to the communication terminal; and
turn on a speaker of the communication terminal to receive the voice call in a case that the protocol data unit information indicates that the call is directed to the communication terminal.

14. The terminal according to claim 8, wherein in a case that the embedded signaling frame is a common notification channel frame, the processor is further configured to:
determine whether a compressed address in the link control signaling is a compressed address of the communication terminal; and
scan a next channel in a case that the compressed address is not the compressed address of the communication terminal.

* * * * *